(12) United States Patent  
Nerling et al.

(10) Patent No.: US 6,267,281 B1  
(45) Date of Patent: Jul. 31, 2001

(54) ROOF RAIL FOR VEHICLES

(75) Inventors: Gregor Nerling, Ratingen; Reinhold Rothstein, Wuppertal, both of (DE)

(73) Assignee: JAC Products Deutschland GmbH, Wuppertal (DE)

( * ) Notice: Subject to any disclaimer, the term of this patent is extended or adjusted under 35 U.S.C. 154(b) by 0 days.

(21) Appl. No.: 09/501,945

(22) Filed: Feb. 10, 2000

(51) Int. Cl.$^7$ ....................................... B60R 9/04
(52) U.S. Cl. .................... 224/326; 224/309; 224/325
(58) Field of Search .................... 224/309, 314, 224/325, 326, 329, 331

(56) References Cited

U.S. PATENT DOCUMENTS

| 4,162,755 | * | 7/1979 | Bott | 224/326 |
| 4,281,783 | * | 8/1981 | Ingram | 224/325 |
| 4,944,439 | * | 7/1990 | Bott | 224/326 |
| 5,839,615 | * | 11/1998 | Ray et al. | 224/326 X |

FOREIGN PATENT DOCUMENTS

| 40 04 829 A1 | 8/1991 | (DE) . | | |
| 197 13 722 A1 | 8/1998 | (DE) . | | |
| 197 13 781 A1 | 8/1998 | (DE) . | | |
| 1009789 | * | 4/1955 | (FR) | 224/325 |
| 76441 | * | 4/1955 | (JP) | 224/309 |

* cited by examiner

*Primary Examiner*—Gregory M. Vidovich  
(74) *Attorney, Agent, or Firm*—Harness, Dickey & Pierce, PLC

(57) ABSTRACT

A roof rail (10), which consists of a side rail (5) and support legs (7, 8). The support legs (6, 7) engage a roof channel (2), which is otherwise closed off by a cover strip (3). The support legs are connected to adaptors (8) at the bottom surface. The connection between the adaptors (8) and the vehicle roof (1) is established by means of threaded bolts (12) which are fastened to the adaptors (8) by means of a threaded portion (14) and to the vehicle roof (1) by means of a second threaded portion (16) with the use of threaded nuts. Each support leg (6, 7) is connected to each respective adaptor in such a manner that it can be loosened, while a bolt (17) with its threaded shaft (21) is screwed into the support leg (6, 7). Here, the bolt head (18) is seated in the adaptor (8) and includes a circular groove (23), one end of which is engaged by a threaded bolt (22) for the purpose of securing it in an axial direction, and where the bolt (22) is extended transversely to the bolt (17).

18 Claims, 2 Drawing Sheets

ROOF RAIL FOR VEHICLES

TECHNICAL FIELD

The invention relates to a roof rail for vehicles with a side rail and support legs, which support the side rail at least at its end regions.

BACKGROUND OF THE INVENTION

A roof rail for vehicles with a side rail and support legs, which support it with respect to the vehicle roof at least at the end regions, with an adaptor, which has been provided for each support leg, having a bottom surface lying upon the bottom of a roof channel and a top surface, which carries the respective support leg, with first, fastening elements for fastening the adaptor to the bottom of the roof channel or to a support structure of the vehicle positioned below it, and second, fastening elements for attaching the adapter to the respective support leg, has become public knowledge from DE 40 04 829 C2. In the case of this known roof rail, the first fastening elements consist of one or several threaded bolts with a first threaded portion, which can be threaded into a bore of the adaptor having an internal thread, and a second threaded portion, which is extended through an opening in the bottom of the roof channel, and a threaded nut, which can be screwed onto it. The second fastening elements include a first and a second bolt, each of which includes a bolt head and a threaded shaft, which passes through a bore in the adaptor, which is free of threads, and which threaded shaft can be screwed into a bore in the support leg, which bore contains an internal thread. When they are threaded into place, the bolt heads of the bolts are supported on the bottom surface of the adaptor.

On the one hand, the known roof rail is easily assembled, but it can only be disassembled with considerable effort, which is perceived to be extremely disadvantageous in practice.

The object of the present invention consists in making available a roof rail for vehicles which can be mounted on the roof in a pre-assembled condition, and which can be fastened from the interior of the vehicle—prior to the installation of the interior trim, is by means of screwing threaded nuts onto the roof of the vehicle in a manner, which is conventional as such, but which, in addition, offers the opportunity of being able to facilitate a disassembly without removing the interior trim of the vehicle and without loosening the fastening elements in the interior of the vehicle.

According to the invention, this task is achieved by the roof rail of the present invention. Further characteristics, which enhance the invention in an advantageous manner, are described and claimed further herein.

By means of the particular design of the second fastening elements, a separation between the support legs and the adaptors can now be effected, namely from the outside of the vehicle, so that the roof rail with its support legs remaining with the side rail can be lifted off of the adaptors, which remain with the vehicle. For this purpose, the threaded bolt, which is seated in the transverse bore of the adaptor, must merely be loosened far enough until its free end releases the circular groove of the bolt head in question. It should be pointed out that a simple disassembly of a roof rail is considered to be very important, and in particular in those instances where a repainting of vehicles is required.

The invention not only offers the advantage of the ability to be easily disassembled and re-assembled, but in addition it is also distinguished in that the attachment locations are completely removed from the eyes of an observer, and thus cannot have an unaesthetic appearance. The transverse bolt, which secures the attachment of the support leg to the adaptor, is located inside the roof channel and thus below a cover strip, which closes off the roof channel.

The invention thus solves the requirement of the automobile manufacturers of coming up with a fastening system, which not only is not visible from the outside, but which, if it is required, still permits disassembly of the roof rail from the outside, and in a perhaps optimal manner.

BRIEF DESCRIPTION OF THE DRAWINGS

Below, the invention is explained in greater detail by means of an example of an embodiment shown in the drawing, and the figures show the following.

DETAILED DESCRIPTION OF THE PREFERRED EMBODIMENT

Figure 1:
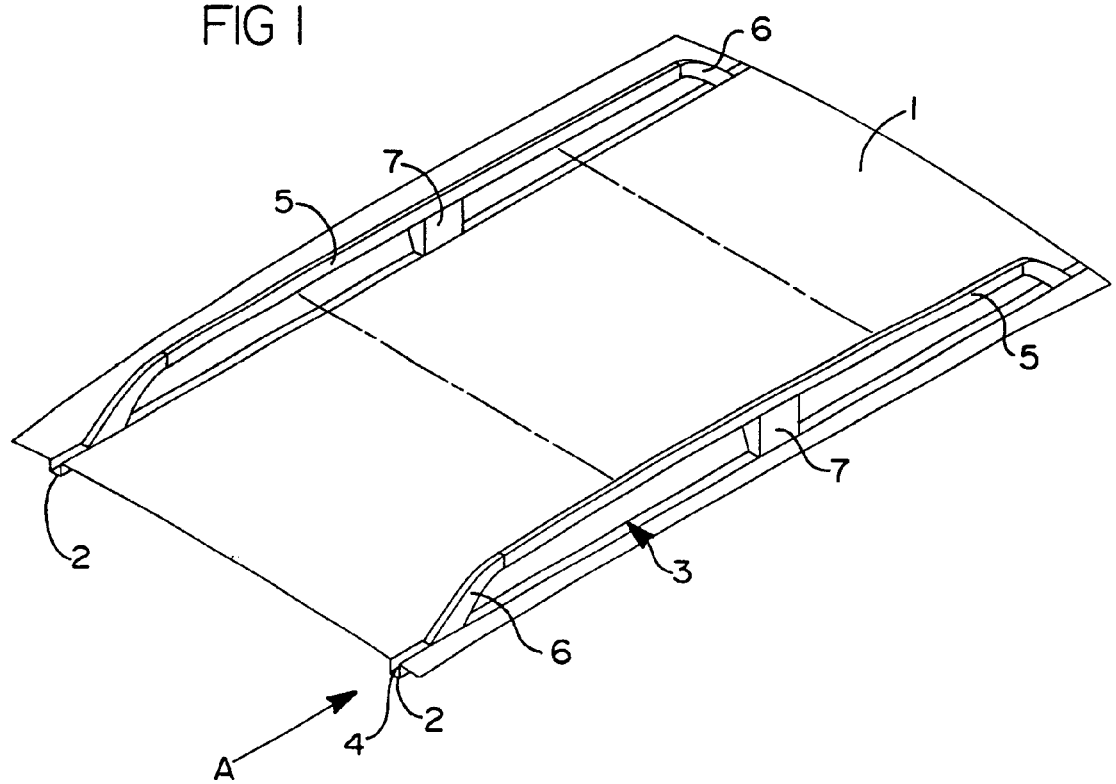
FIG. 1 a roof rail disposed on a vehicle roof, which is supported by support legs, FIG. 2 an intermediate support leg of a roof rail according to FIG. 1 as well as its attachment method and FIG. 3 a view according to directional arrow A (it is noted that the rail and support leg is shown for clarity)
Figure 3:
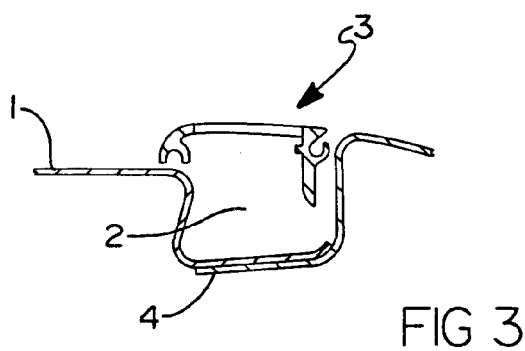

A vehicle roof 1 for a motor vehicle includes in laterally positioned exterior portions always one deepened roof channel 2. Each roof channel 2 is extended in the longitudinal direction of the vehicle and is closed off toward the top by a cover strip 3. Each roof channel 2 has an approximately U-shaped profile in its cross-section, and is composed of a bottom 4 and two upright side walls, which are spaced apart from each other.

On the roof of the vehicle 1 a roof cargo carrier is located, which is formed by two roof rails, which consist of side rails 5, forward and rearward support legs 6, intermediate support legs 7 as well as transverse support members, shown merely as dotted lines, which are attached to the side rails 5. Each of the support legs 6, 7 engage at their respective bottom ends an associated one of the roof channels 2, whose cover strip 3 is interrupted in the region of the support legs 6, 7.

Figure 2:
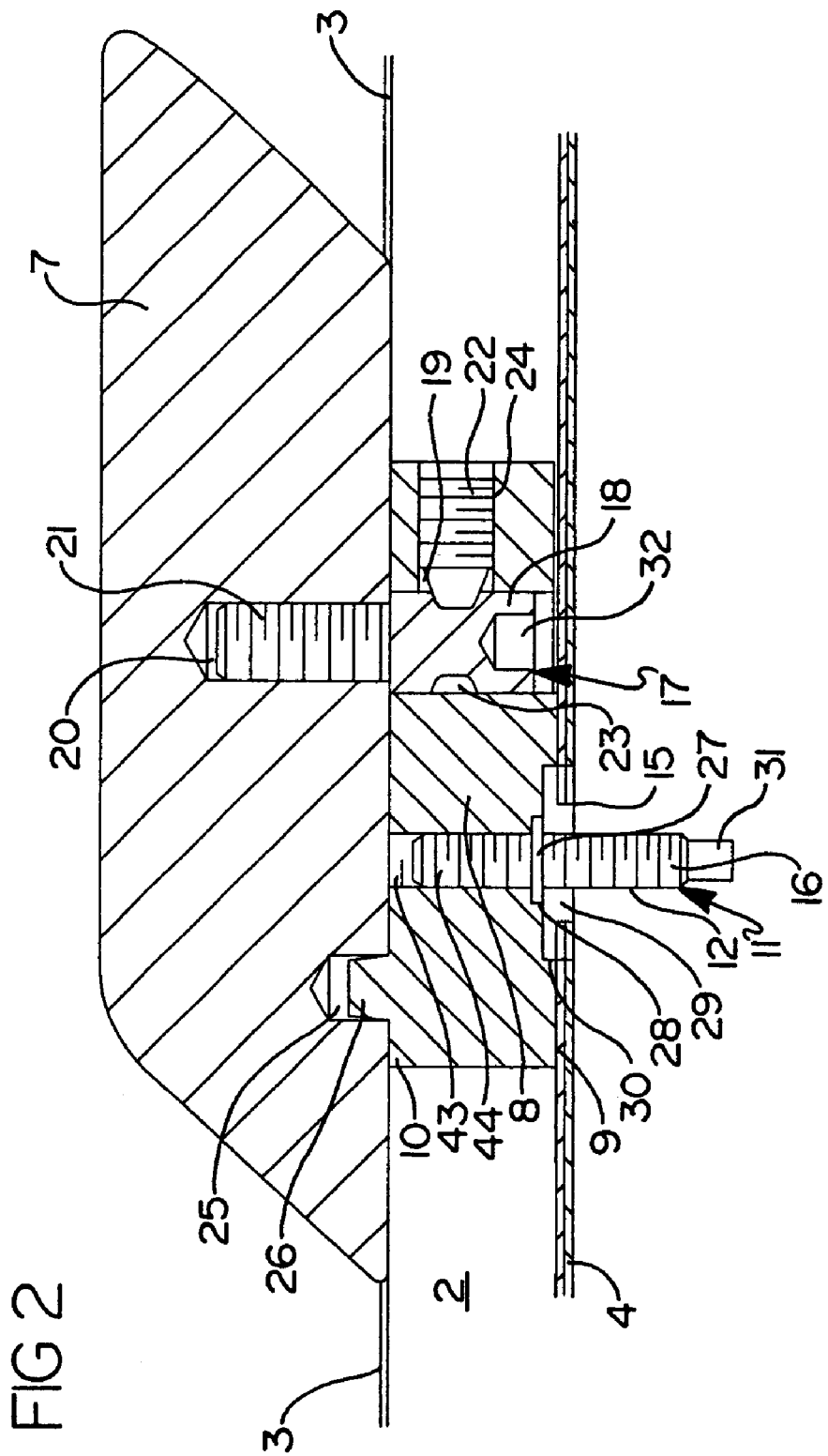

The attachment arrangement of each of the support legs 6, 7 is shown in FIG. 2, which shows an intermediate support leg 7.

Referring further to FIG. 2 the support leg 7 also has an adaptor 8, which has a bottom surface 9 which rests upon the bottom 4 of the roof channel 2, and top surface 10, which carries the support leg 7. For attaching the adaptor 8 to the bottom 4 of the roof channel 2 or to a support structure of the vehicle, which is not shown and which lies below the roof channel 2, fastener elements 11 are provided. The fastener elements 11 consist of one (or several) threaded bolt 12 with a first threaded portion 14 which can be threaded into a bore 13 of the adaptor 8. The bore 13 is provided with an internal thread, and a second threaded portion 16, which is extended through an opening 15 in the bottom 4 of the roof channel 2, as well as through an opening in the support structure lying below it. A threaded nut (not shown) can be screwed onto the threaded portion 16.

For attaching the adaptor 8 to the support leg 7 fastening elements are used. Each fastening element is formed by a first bolt 17 with a bolt head 18, a circular groove 23 in the bolt head 18, and a threaded shaft 21. The threaded shaft 21 extends through a bore 19 which is free of threads and located in the adaptor 8. The threaded shaft 21 can be screwed into a bore 20, which has been provided with an internal thread, and is located in the support leg 7. A second bolt 22 is also included, which is equipped with an external thread and which can be threaded into a through-bore 24 having an internal thread, which through-bore 7 is perpendicular to the bore 19 and which does not contain any threads. After the bolt 22 is screwed into place, its free end engages the circular groove 23 of the bolt head 18 and thus fastens the adapter 8 to the support leg 7.

With further reference to FIG. 2, the adaptor 8 includes a centering set 26 at its top surface 10. The centering set 26 protudes beyond its support surface and engages a recess 25, which is open toward the bottom. In the case of the generally longer front and rear support legs 6, it is recommended to provide several recesses 25 and centering sets 26 which engage them. It is further recommended to provide several fastener elements 11.

Each threaded bolt 12 includes a collar 27 between its threaded portions 14 and 16, which is received by an enlarged portion 28 of the bore 13 of the adaptor 8. At the collar 27 a seal 29 is supported, which is seated at the bottom of a recess 30 of the adaptor 8, and which provides a seal with respect to the opening 15.

At the free end region of the threaded portion 16 of the threaded bolt 12, surfaces of engagement 31 for a screw driver have been formed. The bolt 17 as well as the bolt 22 have surfaces of engagement for tools, e.g., in the form of internal hexagons 32.

The bolt 22, which consists of a stud screw, a set screw or the like, includes a self-locking thread, so that an unwanted loosening of the connection cannot occur.

The new roof rail can be supplied to an automobile assembly plant in a pre-assembled condition where the side rail 5, the support legs 6, 7 and the adapter 8, along with the fastener elements, form a unit, which is ready to be assembled. The assembly takes place in a conventional manner, in that the threaded portions 16 are inserted through the openings 15 in the bottom 4 of the open roof channel 2 and are fastened to the vehicle roof 1 from the interior of the vehicle by means of threaded nuts. The assembly of the cover strip 3 constitutes the end of the assembly process. If the need for a disassembly should occur, e.g. in order to repaint the vehicle, it is merely necessary to remove the cover strip 3 and loosen the bolt 22. During this process, the adaptor 8 remains with the vehicle. After the damage has been repaired, the roof rail with its support legs 6, 7 can again be placed upon the adaptor 8 and fastened to it by tightening the bolts 22. After forcing the cover strip into position, the assembly of the rail is finally completed.

What is claimed is:

1. A roof rail adapted for use with a motor vehicle and adapted to be fixedly secured to an outer body surface of the motor vehicle in a manner which enables same to be quickly and easily removed, without accessing an interior area of the vehicle, and without significant disassembly of mounting structure secured to said outer body surface, the roof rail comprising:

a side rail;

at least one support leg adapted to be fixedly secured to the side rail;

an adaptor adapted to be fixedly secured to said outer body surface for supporting said one support leg thereon;

said adaptor having a first bore and a second bore extending at generally right angles to one another, said second bore being a threaded bore;

a first fastening element extending through said first bore and being adapted to fasten to said support leg;

said first fastening element including a radial groove;

a second fastening element adapted to be threadably inserted into said second bore to engage with said radial groove, to thereby hold said support leg to said adaptor; and whereby partial removal of said second fastening element allows said support leg and said side rail secured thereto to be lifted off of said adaptor without requiring disassembly of said adaptor from said roof or access to said interior area of said vehicle.

2. The roof rail of claim 1, wherein the adaptor further comprises at least one centering set, and wherein said support leg includes a recess, and wherein said centering set is adapted to extend into said recess when said support leg is placed on said adaptor to align said support leg relative to said adaptor.

3. The roof rail of claim 1, wherein said adaptor includes a second threaded bore; and wherein said roof rail further comprises a third fastening element adapted for fixedly securing said adaptor to said outer body surface of said vehicle.

4. The roof rail of claim 3, wherein said third fastening element further comprises a first threaded portion and a second threaded portion separated by a collar;

said first threaded portion and said collar of said third fastening element extending through an opening in said outer body surface and threadably engaging within said second threaded bore in said adaptor; and wherein said second threaded portion of said third fastening element is adapted to receive an external threaded fastening nut to thereby fixedly secure said adaptor to said outer body surface.

5. The roof rail of claim 4, wherein said adaptor is shaped so as to permit said adaptor to reside in a roof channel of said outer body surface.

6. The roof rail of claim 5, wherein said adaptor includes a bottom surface having a recess, and further comprising a seal adapted to fit within said recess.

7. A roof rail adapted for use with a motor vehicle and adapted to be fixedly secured to an outer body surface of the motor vehicle in a manner which enables same to be quickly and easily removed, without accessing an interior area of the vehicle, and without significant disassembly of mounting structure secured to said outer body surface, the roof rail comprising:

a side rail;

at least one support leg adapted to be fixedly secured to the side rail;

an adaptor adapted to be fixedly secured within a roof channel of said outer body surface for supporting said one support leg thereon;

said adaptor having a first bore and a second bore extending at generally right angles to one another and in communication with each other, said second bore being a threaded bore, and a third threaded bore spaced apart from said first and second bores, a first fastening element extending through said first bore and being adapted to fasten to a bottom surface of said support leg;

said first fastening element including a radial groove;

a second fastening element adapted to be threadably inserted into said second bore of said adaptor to engage with said radial groove, to thereby hold said support leg to said adaptor;

a third fastening element for engaging with said third threaded bore and adapted to receive an external fastening nut such that said adaptor can be fixedly secured within said roof channel of said outer body surface; and whereby partial removal of said second fastening element allows said support leg and said side rail secured thereto to be lifted off of said adaptor without requiring disassembly of said adaptor from said roof or access to said interior area of said vehicle.

8. The roof rail of claim 7, wherein said bottom surface of said adaptor further comprises a recess; and a seal adapted to fit within said recess.

9. The roof rail of claim 7, wherein said third fastening element includes first and second threaded portions separated by a collar, said first threaded portion thereof engaging within said third threaded bore and said second threaded portion thereof permitting use of said external fastening nut, and said collar limiting threaded insertion of said first threaded portion into said third threaded bore.

10. The roof rail of claim 7, wherein said adaptor further comprises a centering set projecting from an upper surface thereof; and wherein said support leg further includes a recess formed in said bottom surface thereof for receiving said centering set, to thereby enable said support leg to be centered on said adaptor.

11. The roof rail of claim 7, wherein said second fastening element comprises a set screw.

12. The roof rail of claim 7, wherein said support leg includes a threaded bore in said bottom surface thereof for receiving said first fastening element; and wherein said first fastening element includes a threaded portion for engaging with said threaded bore in said bottom surface of said support leg.

13. The roof rail of claim 7, wherein said first fastening element includes a recess for engaging with a screw driver blade.

14. A roof rail adapted for use with a motor vehicle and adapted to be fixedly secured to an outer body surface of the motor vehicle in a manner which enables same to be quickly and easily removed, without accessing an interior area of the vehicle, and without significant disassembly of mounting structure secured to said outer body surface, the roof rail comprising:

a side rail;

at least one support leg adapted to be fixedly secured to the side rail;

an adaptor adapted to be fixedly secured within a roof channel of said outer body surface for supporting said one support leg thereon;

said adaptor having a first bore and a second bore extending at generally right angles to one another and in communication with each other, said second bore being a threaded bore and extending generally parallel to said roof channel, and a third threaded bore spaced apart from said first and second bores and extending generally perpendicular to said second bore;

a first fastening element extending through said first bore and being adapted to fasten to a bottom surface of said support leg;

said first fastening element including a radial groove disposed at a point along said first fastening element where said radial groove is longitudinally aligned with said second bore when said first fastening element is secured to said support leg;

a second fastening element adapted to be threadably inserted into said second bore of said adaptor to engage with said radial groove, to thereby hold said support leg to said adaptor;

a third fastening element adapted to extend through an opening in said roof channel for engaging with said third threaded bore of said adaptor, and adapted to receive an external fastening nut such that said adaptor can be fixedly secured to said outer body surface within said roof channel;

said adaptor including a centering set projecting outwardly therefrom, and said bottom surface of said support leg including a recess for receiving said centering set to thereby enable said support leg to be aligned on said adaptor; and whereby partial removal of said second fastening element allows said support leg and said side rail secured thereto to be lifted off of said adaptor without requiring disassembly of said adaptor from said roof or access to said interior area of said vehicle.

15. The roof rail of claim 14, wherein said second fastening element comprises a set screw.

16. The roof rail of claim 14, wherein said adaptor includes a bottom surface having a recess; and a seal adapted to rest within said recess for sealing said opening in said roof channel.

17. The roof rail of claim 14, wherein said third fastening element includes first and second threaded portions separated by a collar, said first threaded portion threadably engaging with said third threaded bore, and said second threaded portion adapted to engage with the external threaded nut to permit said adaptor to be fixedly secured to said outer body surface.

18. The roof rail of claim 14, further comprising a cover strip adapted to cover said roof channel; and wherein said second bore is disposed below said cover strip when said cover strip is disposed on said roof channel to thereby hide said second bore from view.

* * * * *

UNITED STATES PATENT AND TRADEMARK OFFICE
CERTIFICATE OF CORRECTION

PATENT NO. : 6,267,281 B1
DATED : July 31, 2001
INVENTOR(S) : Gregor Nerling et al.

It is certified that error appears in the above-identified patent and that said Letters Patent is hereby corrected as shown below:

<u>Title page,</u>
ABSTRACT,
Line 2, "rail (10)" should be -- rail (1) --
Line 3, "legs (7,8)" should be -- legs (6,7) --

<u>Column 1,</u>
Line 42, delete "-"

<u>Column 2,</u>
Line 22, after "is" insert -- not --
Line 22, "clarity);" should be -- clarity). --

<u>Column 3,</u>
Line 4, "through-bore 7" should be -- through-bore 24 --

Signed and Sealed this

Fourteenth Day of May, 2002

Attest:

JAMES E. ROGAN
*Attesting Officer*   *Director of the United States Patent and Trademark Office*